March 27, 1934.     E. W. ARMS     1,952,525
SURVEYING INSTRUMENT
Filed Aug. 31, 1931

Inventor
Edward W. Arms
Attorneys

Patented Mar. 27, 1934

1,952,525

UNITED STATES PATENT OFFICE 1,952,525

SURVEYING INSTRUMENT

Edward W. Arms, Troy, N. Y., assignor to W. & L. E. Gurley, Troy, N. Y., a corporation of New York Application August 31, 1931, Serial No. 560,411

8 Claims. (Cl. 308—74)

This invention relates to axis bearings for surveying instruments, and particularly to bearings adapted for use in transits and the like, which, being portable, are subject to rough usage, and yet must be capable of having accurate adjustment maintained at all times.

In the prior art, it has been customary to construct axis bearings for astronomical instruments and theodolites, so that the trunnions carried by the telescopes rest in sharp V's, with which the trunnions contact at only two points. Instruments of this character must be capable of making high precision measurements, but are frequently lifted out and reversed, and are so heavy that a firm bearing is easily obtained. Furthermore, instruments of this character are not portable; are used in sheltered places where they are not exposed to dust; and the bearings are not lubricated. Under such conditions, the structure outlined has been satisfactory.

In the construction of portable instruments, however, additional problems arise which the axis bearing constructions just described cannot meet. Transits, for example, are transported and used in dusty places, and the telescope trunnions rest in their bearings at all times. Because of these different conditions, instruments of this type must have a very firm strong bearing, but also one which can be lubricated and protected from dirt. The trunnions also must rotate about a mathematical axis because any play between the trunnion and its bearings, will cause the trunnion to roll, thus permitting undesired angular motion of the telescope, and introducing serious errors.

Still another condition which the axis bearings of the portable instruments must meet, is the requirement of an adjustable means for varying the friction against the rotation of the telescope trunnions in their bearings. Each instrument-man desires a particular adjustment, and one instrument must be capable of meeting the needs of several individuals. Such adjustment must be possible without destroying the accuracy of the instrument. Inaccuracies would be introduced if the trunnions were allowed to roll in the bearing blocks.

Attempts have been made to construct axis bearings by dividing the bearing block into two parts, split in such manner that the trunnions are supported at two points, one on either side of the V. The trunnion is held in position by applying pressure to the top half of the split block, and this tension is designed to be sufficient to prevent the axis bearing from rolling. If proper tension is to be secured on such a cap, it is necessary to provide a slight clearance between the cap and the lower part of the bearing or standard, and this clearance renders adjustments for taking up wear difficult and capable of being made satisfactorily only by expert mechanics who place laminated shims underneath the caps. Furthermore, in former constructions this cap was not adequately restrained against shifting.

Bearings for portable instruments must be constructed so that the bearing on one standard can be adjusted in a vertical direction to render the axis of the trunnions perpendicular to the vertical axis of the instrument.

This invention aims to meet satisfactorily all the conditions which are presented in portable instruments, while still providing the necessary adjustments. A preferred embodiment of this invention is shown in the accompanying drawing, wherein,—

Similar reference characters refer to similar parts in each of the several views.

Figure 1:
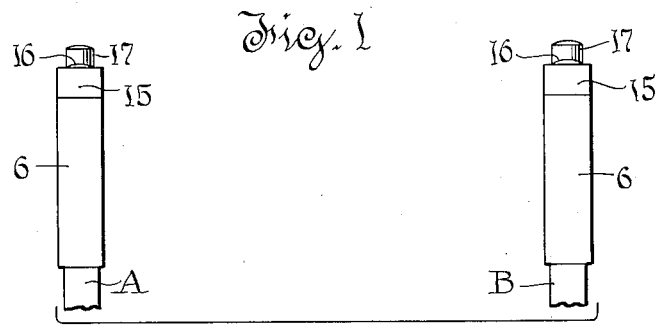
Fig. 1 is a diagrammatic front view of the upper portion of a transit frame showing the relation of the two axis bearings of an instrument embodying this invention.

Referring to the drawing, the reference characters A and B, designate the two standards of a surveying instrument of ordinary form, each of these standards terminating at the top in bearing supporting heads 6. The structure of the two bearings is similar, except that one of them provides for vertical adjustment, and slight changes of structure are necessary to permit this.

The vertically adjustable bearing shown in Figs. 2 and 3, will be described first. The head 6 contains a rectangular opening 7, this opening having an open top and supporting within it a bottom bearing block 8 of substantially U-shape, and forming two discontinuous arcuate contact areas 9 and 10 separated by a recess or groove 11. The areas 9 and 10 contain continuous, separate, annular grooves 20 which support the trunnion of the instrument at a plurality of spaced points. The grooves 20 brace the two standards together (through the telescope trunnions), prevent the oil from working out of the bearing, and prevent dirt from working into it. The separation of the bearing into two lower supporting areas, is in accordance with known practice, as is the use of the grooves 20.

Figures 3, 5:
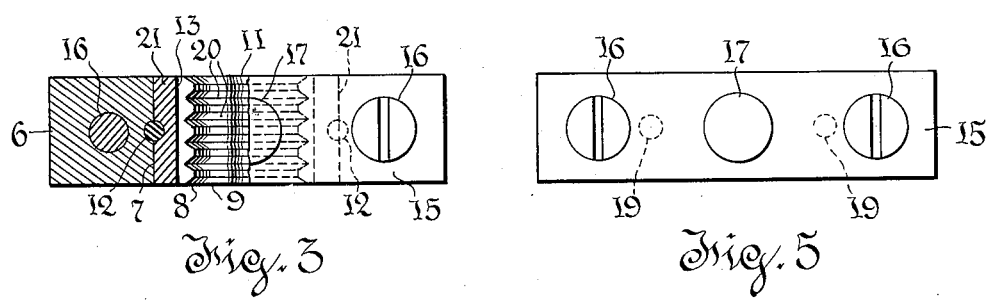
Fig. 3 is a plan view, partly in section, of the bearing shown in Fig. 2.
Fig. 5 is a plan view of the bearing construction shown in Fig. 4.

The bearing block 8 is guided in vertical sliding movement in the opening 7 by dowel pins 12 supported partially in head 6, and partially in the block 8, as shown in Fig. 3. This construction not only fixes the relation of the block 8 to the opening 7 and prevents it from rocking, but permits it to move vertically therein when vertical adjustments of the bearing are necessary. The holes for the pins 12 are drilled after the blocks 8 are in place in the heads 6, thereby insuring accurate location of the blocks.

Bearing block 8 is cut out at the top so as to leave a slot 13 having vertical side walls bounded by upstanding legs 21. Supported and closely confined in this opening 13 and vertically slidable therein, is a top bearing block 14 having a semicircular bearing surface 22 on the lower side thereof, here shown as of slightly less than 180° in angular extent, adapted to contact with the trunnion, and having grooves 20 of the same character as those on the block 8. The essential relation is that there be sufficient clearance between the bearing blocks 8 and 14 to permit the necessary adjustment.

The top of opening 7 is closed by a cap 15 secured on the head 6 by screws 16. This cap 15 carries threaded in it, an adjustable capstan screw 17, which projects from the lower face of the cap into contact with top bearing block 14, and provides for its adjustment. When the trunnion is in place resting on bearing surfaces 9 and 10, the block 14 is secured in close engaging relation with the block 8 by adjustment of capstan screw 17 and is confined against the slightest shifting. Beneath the opening 7, and projecting therein, is an adjusting screw 18 which is threaded into the head 6. This screw is turned into engagement with bottom bearing block 8, to move both bearing blocks together with the trunnion up or down in a vertical plane, when adjustment of the horizontal axis of the telescope is necessary. At such time the capstan screw 17 must also be appropriately adjusted.

Figures 2, 4:
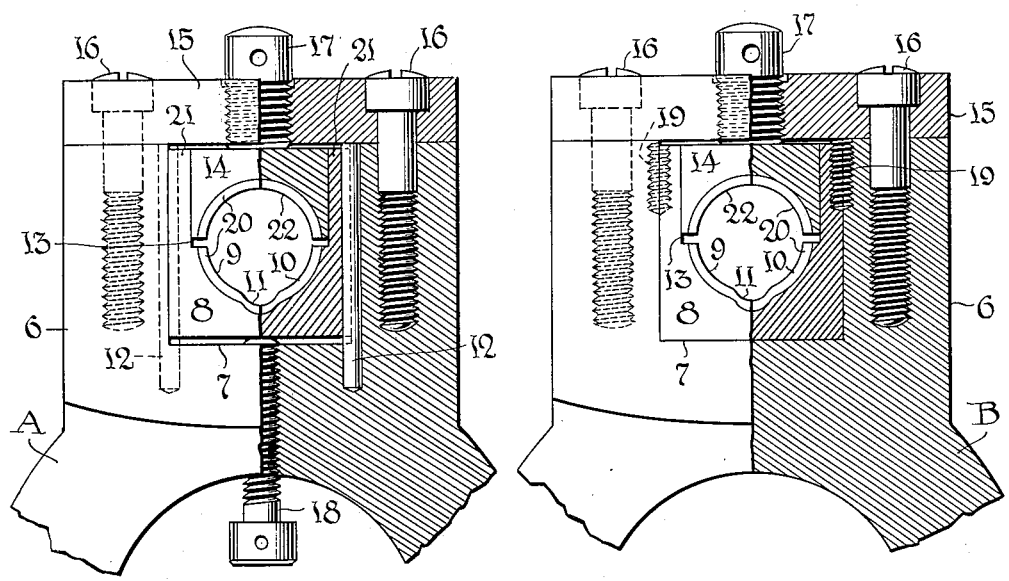
Fig. 2 is a side view of the vertically adjustable bearing, (i. e. the left hand one in Fig. 1), with portions shown in section and portions in elevation.
Fig. 4 is a view similar to Fig. 2 of the nonadjustable bearing, (the right hand one in Fig. 1).

The axis bearing shown in Fig. 4 is carried on the standard B, and is of similar construction to the one already described, except that adjusting screw 18 is omitted. Hence, it is unnecessary to provide dowel pins 12, as the bottom bearing block 8 is always in fixed relation to the opening 7 in head 6. Bottom block 8 is permanently secured in the head 6 by screws 19 placed similarly to the dowel pins 12. Adjustment of the position of top bearing block 14 may be accomplished by moving capstan screw 17, as in the construction already described.

It will be clear that caps 15 are to be screwed down solidly against the heads 6 of standards A and B, and as they have no adjusting function they become rigid structural elements. Adjustment of the horizontal axis of the bearing in standard A can be accomplished by the screw 18, while the closing of the bearing blocks upon the trunnions may be effected in an adjustable degree by the capstan screws 17. This latter adjustment not only insures firm contact between the lower bearing block and the bottom of the trunnion, but the top bearing blocks may be adjusted in such manner as to compensate for wear. Since the top blocks 14 are closely confined laterally and are firmly sustained at their tops, they prevent rolling or rocking of the trunnions in the bearings.

Although this invention has been shown and described as being used in connection with broad bearing blocks, it will be obvious that it can also be used in connection with bearings of the "spool bearing type", in which each trunnion rests on substantially a single thread. In such a case, however, each of the top blocks 14 must be guided in the openings 13 by dowel pins similar to the pins 12 which guide bottom block 8, as shown in Fig. 2. Such a slight modification is necessary to prevent sidewise rocking of these blocks.

The invention just described, not only provides for the adjustments which are necessary to insure absolute perpendicularity between the trunnion axis of the instrument and the vertical axis of the instrument, but it also provides for the adjustments which individual users of such instruments desire to make. It provides for ready compensation for wear on the bearings, for satisfactory lubrication, and at the same time, prevents dirt from entering the bearings, and insures absolute precision and freedom from rocking motion at all times.

Although the preferred embodiment of this invention has been shown and described, it is desired that no unnecessary restrictions be placed on the language of the claims, other than are required by the limitations imposed by the prior art.

What is claimed is:

1. An axis bearing for precision instruments comprising a standard having an opening in the top; a bottom bearing block of substantially U-shape mounted in said opening; a top bearing block slidably mounted in said U-block and rigidly held against lateral or tilting movement and means for closing said opening to hold said bearing blocks in place.

2. An axis bearing for precise geometrical instruments comprising a standard having a slot in the top; a bottom bearing block in said slot, said block having two oppositely related arcuate bearing surfaces; a top bearing block vertically slidable in said bottom block, said top block having a bearing surface less than 180° in extent and rigidly held against lateral movement; a fixed cap for closing said slot and holding said blocks therein; and means for adjusting the downward thrust on said top block.

3. An axis bearing for portable surveying instruments comprising a standard having a slotted top; a bottom bearing block vertically slidable in said slot; a pair of dowel pins for holding and guiding said bottom block in said opening; a top bearing block slidably mounted in said bottom block and having a bearing surface less than 180° in extent, said top block being fixed against lateral movement; a cap for said bearing; and means for stressing said top bearing block.

4. An axis bearing for precise geometrical instruments comprising a standard having an opening in the top; a U-shaped bearing block in said opening; means cooperating with the arms of the U and the sides of the opening for holding said block in fixed position in said opening; a top bearing block mounted for vertical non-tilting adjustment in said U-block; a fixed cap for the bearing; and means for exerting thrust on said top block.

5. An axis bearing for precise geometrical instruments, comprising a standard having an opening at the top; a bottom bearing block in said opening, said block having two oppositely related arcuate bearing surfaces; a pair of dowel pins for securing said block in place and guiding it for vertical movement; means for adjusting said block vertically; a top bearing block adjustably mounted in said bottom block; a fixed cap for closing the opening in said top and holding said blocks in place; and means for exerting thrust on said top block.

6. An axis bearing for precise geometrical instruments comprising a standard having a bearing confining recess in its top; a bearing structure closely confined against lateral or tilting movement in said recess, and comprising upper and lower bearing members shiftable toward and from each other; a cap member rigidly mounted on the top of said standard and bridging said recess; and adjustable means carried by said cap member and reacting downward against the upper of said bearing members.

7. An axis bearing for precise geometrical instruments, comprising a standard having an opening in the top; a vertically adjustable bottom bearing block mounted in said opening; a top bearing block vertically slidable in said bottom block and held against lateral movement; and a fixed cap for said opening.

8. In a precise geometrical instrument, a bearing subject to intermittent reversal and limited movement, said bearing comprising a standard having an opening in the top; a fixed cap secured to said standard and bridging said opening; a bottom bearing block mounted in said opening and secured against lateral or tilting movement therein, said bottom bearing block having upstanding legs; a top bearing block vertically slidable between said legs and positively restrained from lateral movement; and means carried by said fixed cap and cooperating with said top bearing block for subjecting said block to varying pressures.

EDWARD W. ARMS.